Feb. 3, 1970            K. D. DOYLE            3,493,121
TELESCOPING SUPPORT ROD AND END CAP THEREFOR
Filed April 12, 1967
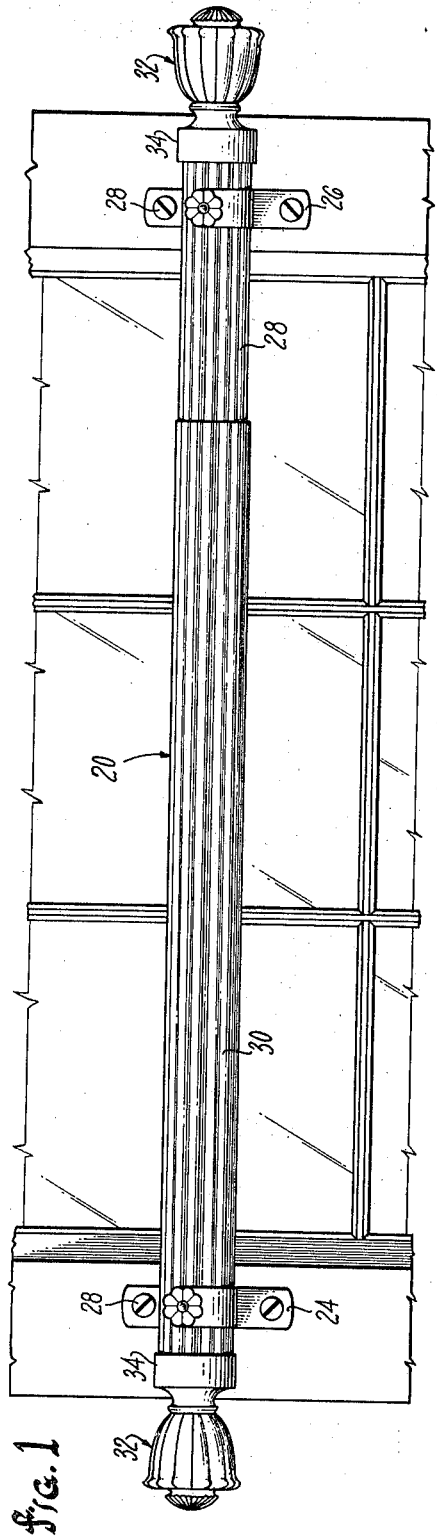
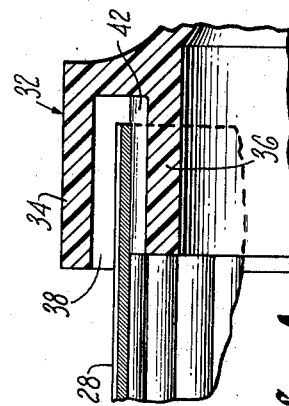
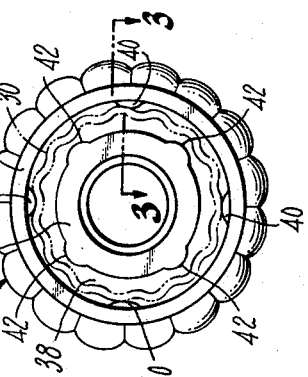
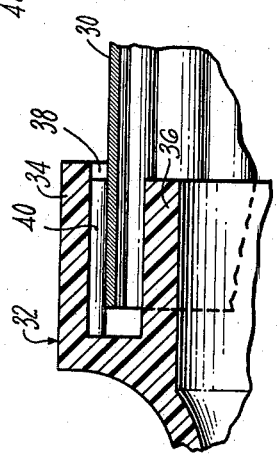
INVENTOR.
KIERAN D. DOYLE
BY *Lindsey, Prutzman and Hayes*
ATTORNEYS

United States Patent Office 3,493,121
Patented Feb. 3, 1970

3,493,121
TELESCOPING SUPPORT ROD AND END CAP THEREFOR
Kieran D. Doyle, Wallingford, Conn., assignor to The Stanley Works, New Britain, Conn., a corporation of Connecticut
Filed Apr. 12, 1967, Ser. No. 630,322
Int. Cl. A47h *1/08, 1/102*
U.S. Cl. 211—105.3                    7 Claims

ABSTRACT OF THE DISCLOSURE

A telescoping support rod for draperies and the like having a universal end cap provided with a pair of continuous coaxial walls connected to a bottom wall to provide an annular clearance with a set of angularly spaced ribs extending into the clearance from each of the walls and with one set engageable with the associated telescoping rod member nested in the clearance.

---

This invention relates to telescoping support rods for draperies and the like and is particularly directed to end caps or finials for a telescoping drapery support rod wherein a single end cap may be assembled over either the larger or smaller of the telescoping members foaming the rod to be frictionally secured thereto.

One of the objects of the invention is to provide a novel universal end cap frictionally engageable with either end of the assembled members forming a telescoping support rod.

A further object of this invention is to provide a single end cap concentrically mountable on the end of either the inner or outer one of the telescoping members forming a seamless telescoping support rod by frictional engagement with peripheral surfaces thereof. Included in this object is the provision of an end cap providing a uniform and balanced appearance on both ends of a telescoping support rod.

A still further object of this invention is to provide a single end cap for a tubular telescoping support rod which overlies the end of the rod and is frictionally held in coaxial alignment therewith.

Other objects wil lbe in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawing:

FIG. 1 is a front view of a telescoping support rod for draperies and the like incorporating the end caps of the present invention;

FIG. 2 is an end view of the end cap of FIG. 1 showing, in phantom, the assembly of an outer rod member with the end cap;

FIG. 3 is a fragmentary cross-sectional view taken along lines 3—3 of FIG. 2 and showing in solid lines the end cap assembled on the outer of the telescoping rod members; and FIG. 4 is a fragmentary cross-sectional view similar to FIG. 3 and showing the end cap assembled on the inner of the telescoping rod members.

Referring now to the drawings in which like numerals refer to like parts throughout the several views, there is shown in FIG. 1 a telescoping drapery support rod 20 mounted on a window frame by a pair of brackets 24, 26 by suitable fasteners such as screws 28. The support rod 20 comprises an inner telescoping member 28 and an outer telescoping member 30 of similar cross-sectional configuration assembled in close fitting telescoping relationship for adjusting the length of the rod 20. The telescoping members 28 and 30 are shown as being seamless tubular members of generally circular cross section which may be beaded, fluted, reeded or smooth as desired.

In accordance with this invention, a single end cap or finial 32 formed of any suitable material such as molded polystyrene is constructed and arranged so as to overlie and frictionally engage either end of the telescoping rod 20. Referring particularly to FIG. 2, the end of end cap 32 is provided with a continuous or unbroken cylindrical outer wall 34 and a coaxially disposed continuous or unbroken inner wall 36 spaced inwardly therefrom to define an annular recess 38. The inner surface of outer wall 34 is provided with a set of axially extending ribs or protuberances 40 projecting into the annular recess 38. The ribs 40 shown as being four in number are equiangularly spaced around the inner periphery of the wall 34.

A second set of protuberances or ribs 42 are likewise disposed on the outer surface of wall 36 and extend into the annular gap 38. The ribs 42 are likewise axially disposed and equiangularly spaced about the outer periphery of the wall 36. As best shown in FIG. 2, the ribs 42 alternate with the ribs 40 about the annular recess 38 and are of limited radial length so as to receive the outer rod member 30 or the inner rod member 28 so that each rod member engages only one of the set of ribs 40, 42.

FIG. 2 shows in phantom the engagement between the outer rod member 30 and the ribs 40 of the end cap 32.

In the fluted rod member illustrated, the generally circular configuration thereof is formed of alternate ridges and valleys. As shown, the dimensions of the alternated ridges and valleys and the nominal diameter of the rod are such that the end cap has an interference fit with ribs 40 of the rod member 30. Since the resistance to deformation of the walls of rod member 30 is essentially uniform and the ribs are placed uniformly equiangularly around the wall 34, the end cap will be automatically centered on the rod during assembly and, despite manufacturing variances and tolerances in the outer rod members 30 and the end caps 32, is frictionally engaged thereon.

FIG. 4, which is similar to FIG. 3, illustrates the assembly of the inner rod 28 and the end cap 32. As with the outer rod member 30, ribs 42 are dimensioned to engage rod member 28 with an interference fit to accommodate dimensional variations to assure a tight frictional fit. It will be further noted in FIG. 4 that the outer wall member 34 overlies, but does not engage, inner rod member 28. However, with the wall 34 having the same diameter on each of the end caps, a visual symmetry is created despite the variation in the outer diameter of the inner rod 28 and the outer rod member 30.

The embodiments of the invention in which an exclusive property or privilege is claimed are defined as follows:

1. In combination, a telescoping support rod for draperies and the like comprising a pair of snugly interfitting telescoping rod members of similar cross-sectional configuration and an end cap mounted on each end thereof, the improvement wherein the end caps are identical and comprise a pair of continuous coaxial walls spaced apart to provide a peripheral clearance therebetween, a set of angularly spaced protuberances on each of said walls extending into said peripheral clearance, said peripheral clearance adapted to receive the end of either of said telescoping rod members to engage a peripheral surface thereof to secure the cap thereon.

2. The device of claim 1 wherein the outer of said coaxial walls is positioned in engagement with and around the outer of said telescoping rod members and the inner of said coaxial walls is positioned within and in engagement with the inner of said telescoping rod members.

3. The device of claim 1 wherein only one set of protuberances of each end cap are engageable with the support rod.

4. The device of claim 3 wherein each set of said protuberances comprise a plurality of axially extending equiangularly spaced ribs.

5. A device as recited in claim 4 wherein the ribs comprising one set of protuberances are angularly offset relative to the ribs of the other set.

6. The device of claim 4 wherein the telescoping rod members are formed of generally tubular stock having longitudinally extending alternating ridges and valleys, said ridges being constructed and arranged so as to engage at least some of the ribs of the associated end cap during assembly.

7. The device of claim 4 wherein said concentric walls extend axially from a bottom wall of the end cap to provide a generally annular recess therebetween.

References Cited

UNITED STATES PATENTS

| | | | |
|---|---|---|---|
| 684,674 | 10/1901 | Clark | 160—393 XR |
| 1,456,214 | 5/1923 | Boye | 211—105.3 XR |

BOBBY R. GAY, Primary Examiner

ANDREW M. CALVERT, Assistant Examiner

U.S. Cl. X.R.

16—87, 138—109